US005201976A

United States Patent [19]

Eastin

[11] Patent Number: 5,201,976

[45] Date of Patent: Apr. 13, 1993

[54] METHOD OF PRODUCING A CONTINUOUS LABEL WEB

[75] Inventor: David L. Eastin, Hudson, Ohio

[73] Assignee: Morgan Adhesives Company, Stow, Ohio

[21] Appl. No.: 697,231

[22] Filed: May 6, 1991

[51] Int. Cl.[5] .............................. B32B 31/04

[52] U.S. Cl. .............................. 156/152; 156/230; 156/238; 156/247; 156/249; 156/344; 427/208; 427/208.4; 427/208.6; 427/208.8; 428/40; 428/41

[58] Field of Search .............. 156/152, 230, 238, 247, 156/249, 344; 427/208, 208.4, 208.6, 208.8; 40/2 R; 428/40, 41

[56] References Cited

U.S. PATENT DOCUMENTS

| | | | |
|---|---|---|---|
| 2,914,167 | 11/1959 | Holtz | 427/208 |
| 3,543,920 | 12/1970 | Crocker et al. | 427/208 |
| 3,854,229 | 12/1974 | Morgan | 40/2 R |
| 3,967,031 | 6/1976 | Lambert | 428/294 |
| 4,041,200 | 8/1977 | Boranian et al. | 427/208 |
| 4,219,596 | 8/1980 | Takemoto et al. | 428/41 |
| 4,495,016 | 1/1985 | Viberg et al. | 156/249 |
| 4,544,590 | 10/1985 | Egan | 428/40 |
| 4,617,199 | 10/1986 | Galli et al. | 427/208 |
| 4,886,680 | 12/1989 | Tindall | 427/8 |
| 4,888,078 | 12/1989 | Instance | 156/249 |

*Primary Examiner*—Caleb Weston

*Attorney, Agent, or Firm*—Oldham, Oldham & Wilson Co.

[57] ABSTRACT

A pressure sensitive adhesive label system collectible in a continuous roll form. A transparent release liner removed from the stock roll is collected and subsequently reapplied to the upper surface of the web as an overlaminate layer to provide rigidity and protect printed indicia of the face material. The process of manufacturing the label system produces a quality label product in roll form without die cutting and results in the recycling of the release liner while eliminating release liner and matrix waste.

21 Claims, 2 Drawing Sheets

METHOD OF PRODUCING A CONTINUOUS LABEL WEB

TECHNICAL FIELD

The present invention relates to pressure sensitive adhesive labels and methods for manufacture of the same. More specifically, the present invention relates to a continuous web of face material coated with a pressure sensitive adhesive disposed on one surface and laminated film applied to the opposite surface. The release liner removed from the web is collected and ultimately reapplied to the uncoated upper surface of the web to serve as an over laminate layer protecting the printing on the face material. The end product is collected in roll form, thus eliminating the need for a release liner in the end product. The release liner has in essence been recycled so as to serve a second distinct function.

BACKGROUND OF THE INVENTION

It has long been known to manufacture and utilize pressure sensitive adhesive stock for labels, tapes, films, closure systems and the like. Pressure sensitive adhesives are themselves well known and are available with a wide variety of properties depending on their end use. Pressure sensitive adhesives are especially useful in the manufacture and the application of labels because of their ability to form an immediate bond.

Typically, these labels will be die cut from a web of face material, and have printed indicia on an upper surface. The lower surface of the face material is coated with a layer of pressure sensitive adhesive. A release liner having a release coating is removably adhered to the adhesive coated side of the label for protection of the coated surface during shipping and storage. The release liner further serves as a means to deliver a label to the application site and as a means for applying the label to the product. This release liner is easily removed either manually or automatically at the site of end use and the adhesive, having a greater affinity for the face material than for the release liner, remains in tact on the label, thereby enabling the label to be attached to the desired surface. A protective coating or thin transparent plastic film is often applied to the top surface of the label for protection from disfiguration.

These labels are either manually or automatically applied to the desired surface by separating or removing the label from the release liner. The release liner is virtually useless after its removal from the labels and when used in large applications a substantial volume of liner is generated. Disposal and collection of this liner waste can be time consuming and a nuisance. Furthermore, because of its silicone coating, the release liner is not normally reusable or a candidate for most recycling projects. Additionally, the silicone coating often makes the liner slippery and if not substantially or immediately collected, the presence of any portion of this liner on the floor in or around the work station creates a potential safety hazard.

Similarly, the matrix removed from a web of die cut labels produces similar problems regarding collection and disposal. Since the matrix is coated with adhesive it is virtually unrecyclable with existing technology and often refused at waste collection sites.

Therefore, it is desirable to have a roll of pressure sensitive adhesive label material which is self wound and which eliminates the necessity of a release liner.

Additionally, supplying such labels in a continuous web, separated by perforations, as opposed to die cutting each label, eliminates a potentially costly and time consuming step in the manufacture of such labels as well as generated waste matrix.

U.S. Pat. No. 4,886,680 discloses a method of applying an adhesive coating to one side of a web and a silicone coating to the opposite side of the web, thus supplying the web in a rolled form without a release liner. While this reference shows a method for producing a rolled web of pressure sensitive adhesive film, it lacks any teaching with regard to producing a web of pressure sensitive adhesive labels having a protective laminate releasable from the adhesive. This patent does not disclose any reuse of the release liner as the web's overlaminate layer and requires the purchase of special applicator equipment by the end user.

Therefore, based on the limitations and deficiencies in the known prior art, the present invention is subsequently presented.

SUMMARY OF THE INVENTION

The present invention discloses a continuous roll of pressure sensitive adhesive labels, separated by perforated cuts, scores or the like and lacking a release liner backing sheet. In a preferred embodiment, the final product is produced from an initial web of face material having an adhesive covered by a release liner which is unwound from the supply roll. The upper surface of the web receives color and/or printing thereon. Subsequently, this upper surface is coated with an essentially permanent and transparent adhesive so that a release liner, removed from a previous supply roll, can be over laminated onto the face material to serve as a protective barrier layer.

Following lamination, the web's original release liner is separated from the face material and collected on a roller assembly, for use as an overlaminate layer on subsequent label webs. Perforated cuts are then made in the lamination and the web is wound onto rolls by a rewind unit.

The overlaminate protects the printing from damage, moisture, etc. and provides an excellent release surface for the pressure sensitive adhesive as a self wound roll. As a result, a suitable pressure sensitive adhesive label is created which does not utilize a separate release liner or backing sheet.

Therefore, it is a principal object of the present invention to provide a continuous plurality of laminated pressure sensitive adhesive labels supplied on a roll without the use of a separate release liner covering the adhesive layer.

It is another object of the present invention to provide a continuous plurality of laminated pressure sensitive adhesive labels capable of receiving printed indicia thereon and being separated from one another and collected on a self wound roll, thereby eliminating the process of die cutting such labels.

It is still another object of the present invention to provide a continuous plurality of laminated pressure sensitive adhesive labels supplied on a roll without the need for a separate release liner covering the adhesive layer to eliminate the potential safety hazard created by the presence of the discarded release liner or matrix at a work station.

It is still another object of the present invention to provide a continuous plurality of laminated pressure sensitive adhesive labels which promotes the conservation of resources by reusing a previously collected web of release liner as the overlaminate layer on said labels.

It is still another object of the present invention to supply a plurality of laminated pressure sensitive adhesive labels which when supplied on a roll without the use of a separate release liner which reduces the overall mass and allows a greater number labels to be included in a standard size roll than do conventional pressure sensitive adhesive labels which are die cut and/or utilize separate release liners.

It is yet another object of the present invention to supply a continuous plurality of laminated pressure sensitive adhesive labels which although comparable in function and applicability to conventional label tape, provide superior aesthetics. These an other objects may be accomplished with the present invention which comprises a method of producing a continuous web of labels comprising the steps of: obtaining a web of base label stock, said web having a first and a second surface; applying an adhesive layer to said first web surface; releasably contacting a release liner to said adhesive, said release liner having a low energy bonding surface and a high energy bonding surface, said low energy bonding surface in contact with said adhesive, applying printed indicia to said second web surface; applying a second adhesive to said second web surface; removing said release liner from said pressure sensitive adhesive layer; reapplying said release liner to said second adhesive on said second web surface, such that said high energy bonding surface engages said second adhesive; winding the web into a rolled form.

BRIEF DESCRIPTION OF THE DRAWINGS

The objects and advantages of the present invention will become apparent from a reading of the following detailed description with reference being made to the accompanying drawings, wherein.

FIGS. *1a–1d* are diagrammatic illustrations of the principal steps in the manufacture and use of the product embodying the present invention.

DETAILED DESCRIPTION OF THE PREFERRED EMBODIMENT

Figure 1:
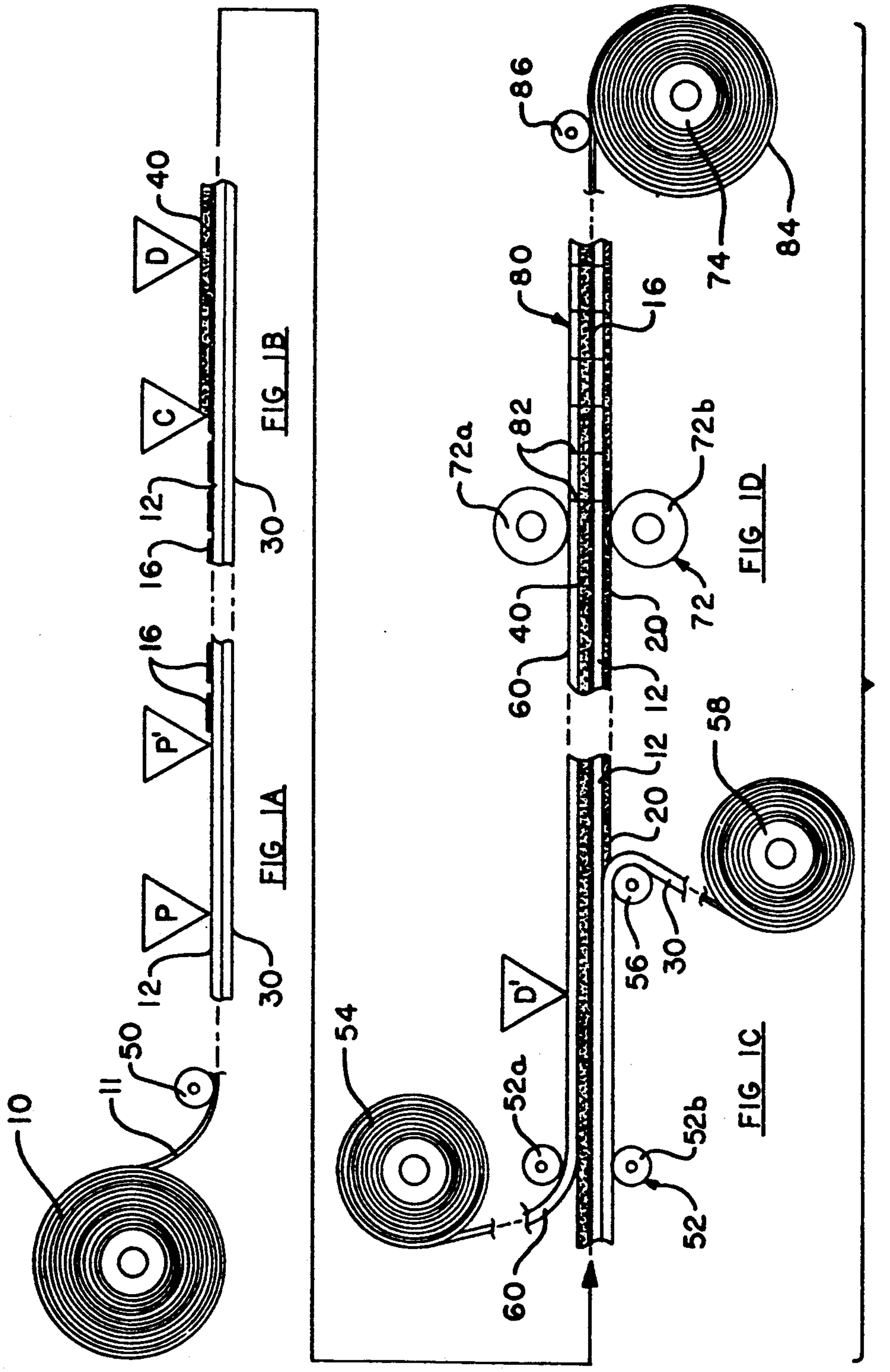

This invention will be described in detail with reference to the preferred embodiment thereof. Like elements are identified by reference numbers throughout the drawings and specification.

Referring now to the drawings, FIGS. *1a–1d* diagrammatically illustrate a method of the manufacture of a continuous web of label stock having a pressure sensitive adhesive disposed on one side of the web and a laminate layer on the other side of the web, so that the resulting web can be wound into one or more rolls, as will be explained subsequently, without requiring the use of a separate release liner.

Figure 2:
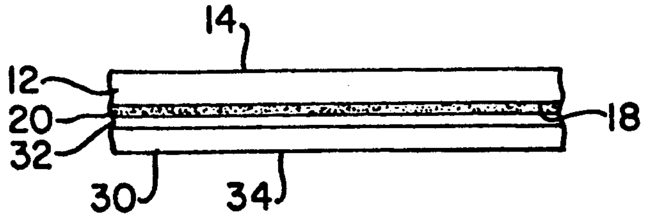
FIG. 2 is a fragmentary cross-section of a web of standard face material coated on one surface with a pressure sensitive adhesive protected by a release liner as it leaves the supply roll illustrated in FIG. *1a;*

In FIG. *1a,* the process begins with the unwinding of web 11 from a supply roll, generally 10, comprising a continuous length of face material 12 coated with a pressure sensitive adhesive 20 on one side as further illustrated at FIG. 2. A release liner 30 of substantially equal or greater dimension than the face material 12 is removably attached to the pressure sensitive adhesive 20.

Face stock material 12 has a second surface or printable surface 14 suitable to receive ink, pigment, or clear coating 16 thereon. A first surface or inner surface 18 of face stock 12 is that which is previously coated with a layer of pressure sensitive adhesive 20. The face stock 12 may be of a paper, vinyl, plastic, composite or other suitable material as may be known in the art. The face stock 12 is selected based on suitable characteristics for its end use such as printability, weatherability, stiffness, tensile strength and also recyclability, among other considerations.

Pressure sensitive adhesive layer 20 can be made of virtually any adhesive known to those in the art, and selected based on the ultimate use for the label. A high energy adhesive, generally a rubber base adhesive is utilized to form an essentially permanent bond between the label and the mounting surface. A low energy adhesive, such as an acrylic base adhesive, possesses qualities of quick, non-permanent and even reusable adhesion. One contemplated substrate for this label system is vehicle tires which typically present difficulties in obtaining good adherence from an adhesive.

Release liner 30 is removably adhered to adhesive layer 20 as the web 11 leaves the supply roll 10. In the preferred embodiment the release liner 30 is a transparent, polypropylene film, generally about 2 mils in thickness. One such polypropylene film commonly used as a release liner is made by Mobil Corp. and sold commercially under the trademark "Label-Mate TM". Other films such as polyesters, high density polyethylene, and co-polymers thereof, may also be used. Release liner 30 has an inner surface 32 which possesses a silicone coating or similar low energy surface forming an easily releaseable bond with adhesive layer 20.

Figure 3:
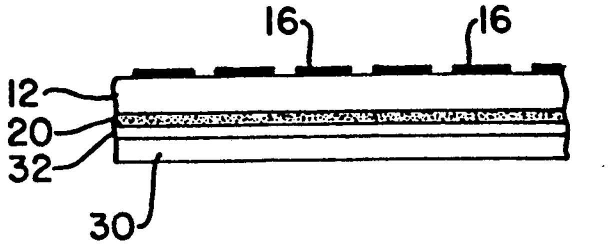
FIG. 3 is a fragmentary cross-section of the label web as it leaves the print station as illustrated in FIG. *1a;*

The web 11 of face stock 12 with release liner 30 in tact is unwound from supply roll 10 and around idler roll 50 as indicated diagrammatically in FIG. *1a* and in the form shown in FIG. 2. At stations P and P', one or more print or color stations apply printed indicia 16 on the printable surface 14 of face stock 12. FIG. 3 illustrates the cross-sectional appearance of the label web 11 as it leaves the print station. In the preferred embodiment it is desirable to have face stock 12 and printing 16 which are compatible to yield high quality, including bar coding.

Figure 4:
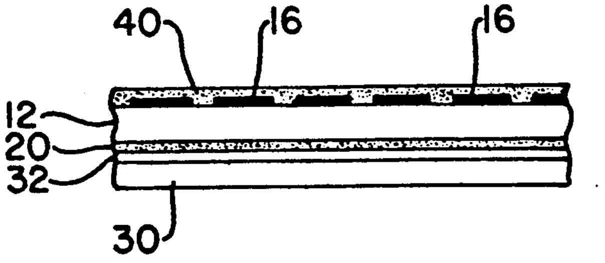
FIG. 4 is a fragmentary cross-section of the label web after the web passes through the adhesive coating station illustrated in FIG. *1b;*

Web 11 travels along the production line and as shown in FIG. *1b* the printable surface 14 of face stock 12 is coated with a high energy adhesive at station C, as illustrated in FIG. 4 to prepare the face stock 12 for receiving a protective overlaminate layer 60, described subsequently in further detail. Adhesive 40 is preferably transparent and compatible with the previously printed material 16 applied to the printable surface 14 of face stock 12. One such compatible adhesive is a clear, acrylic overlaminate adhesive available commercially as MP-105 from the Morgan Adhesives Company.

Other suitable adhesives as are known in the art are also contemplated. Such adhesives, may be of types such as emulsion, hot melt, radiation curable, acrylic, E.B., rubber or combinations of the same.

Immediately following the coating of face stock 12 at station C with most adhesives such as MP-105, the web passes a drying station D. The drying station is contemplated as radiation curable curing convection or IR type although other techniques may be used.

Figure 5:
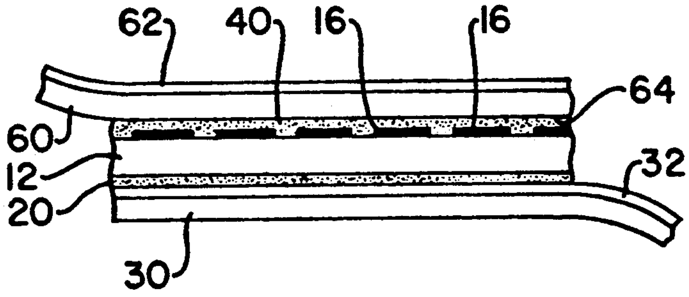
FIG. 5 is fragmentary cross-section of the label web illustrating the application a laminate on the top surface and the removal of the release liner from the lower surface shown in FIG. *1c;*

Immediately following the application of adhesive coating 40 at station C, overlaminate layer 60 is unwound from supply roll 54 and combined with face stock 12 to form a multi-layer lamination. An important aspect of this invention is the use of release liner 30, previously removed and collected from the web as will be further explained, as the overlaminate layer 60. Overlaminate layer 60 is compressed onto face stock 12 at pressure roller assembly 52 as shown in FIG. 5 and diagrammatically at FIG. 1*c* such that the second surface 64 is placed into contact with adhesive 40 on printable surface 14 of face stock 12 and coated surface 62 becomes the outer or exposed, surface of release liner 30, now laminate layer 60. This lamination passes through pressure roller assembly 52 to insure good contact between face stock 12 and overlaminate layer 60.

Pressure roller assembly 52 is disclosed as a two roller assembly where pressure roller 52*a* presses overlaminate layer 60 onto face material 12 and against anvil roller 52*b*. Alternative pressure roller assemblies may function equally as well. For instance an assembly using a single roller about which the web is pulled around at an angle may be utilized.

Adhesive 40 used to adhere overlaminate layer 60 to face stock 12 can alternatively be coated onto surface 64 of laminate layer 60 by conventional means known in the art, prior to and instead of coating face stock 12 with this same adhesive layer 40.

With the use of certain UV curable adhesives, it may be desirable or necessary to apply overlaminate layer 60 to face material 12 and thereafter perform the drying step using techniques of UV curing at station D′ of FIG. 1C, thus eliminating the drying station D in FIG. 1B.

Following the application of overlaminate layer 60 onto the printable surface 14 of face stock 12 as shown in FIG. 5, release liner 30 is pulled around an idler roll 56 and separated from adhesive layer 20 as disclosed in FIG. 1*c*. Release liner 30 is collected by a rewind roller assembly 58 and wound around itself in roll form. After a substantial length of release liner 30 is collected, the release liner 30 is cut or otherwise terminated and the rolled liner 30 is transferred to the overlaminate dispensing roller 54 for use as a overlaminate layer 60.

Alternatively, release liner 30 can be separated from the lower surface 18 of face stock 12 and transferred through a series of rollers to a position on the web where it is immediately reapplied to upper surface 14 face stock 12 as laminate layer 60, without collecting release liner 30 only rewind assembly 58.

Figure 6:
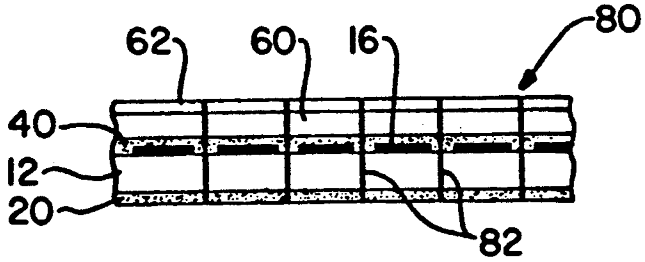
FIG. 6 is a fragmentary cross-section of the label web illustrating a preferred embodiment of the end label product illustrated in FIG. *1d.*

As the completed face stock 12 with overlaminate layer 60 adhered thereto, shown in FIG. 6, leaves the laminator assembly stage 52 and release liner removal assembly stage 56, it passes through a cutter assembly 72, illustrated at FIG. 10 which makes a perforated cut 82 perpendicular to the longitudinal axis of the web at predetermined intervals, thereby defining sequential labels 80. Such cuts 82 are sufficient to permit easy separation of sequential labels 80 by manual or automated means, while still allowing the web to be pulled from the roll 84 without inadvertent separation of labels 80 along the perforated lines 82. Cutter assembly 72 is disclosed herein as a two roller system, whereby cuts are made by cutting wheel 72*b* from the bottom of face material 12 as the face material is pressed against pressure wheel 72*a*. However, any known perforating, scoring assembly may be used as well as any method for defining sequential labels.

While the preferred embodiment discloses the application of overlaminate layer 60 onto the printable surface 14 of face stock 12, occurring prior to the removal of the release liner 30 from the inner surface 18 of face stock 12, the steps can be performed essentially simultaneously or in reverse order.

The continuous web of labels 80 are collected onto a roll 84 by a rewind assembly 74. It may be desirable in certain instances to provide a pressure roller 86 to provide pressure at the point of contact between the web and roll 74 to insure the removal of air from between the layers for good lamination between adjacent coils. Alternatively, labels 80 can be cut at predetermined intervals to form sheets, placed one over top of another to form a stack or pad of labels. However, it is presently preferred to provide labels 80 in a rolled form wherein the adhesive layer 20 of one coil removably adheres to the coated surface 62 of laminate layer 60 of the labels 80 on the coil immediately below. Conversely, the labels 80 of the upper coil easily releases itself from coated surface 62 of the underneath layer when removal is desired.

The contemplated face material 12 used in this product and method ranges typically from 2–5 mils in thickness. However, the use of a release liner 30 which subsequently serves as overlaminate layer 60 provides the web with requisite strength and stiffness such that face material 12 having thicknesses from $\frac{3}{4}$–1 mil and, preferably $\frac{3}{4}$ mil is capable of receiving printed indicia 16 thereon, while still being of sufficient strength for application to a substrate. Such reduction in mil thickness reduces the volume of an equal number of labels compress with existing technology and promotes conservation.

The method presented herein requires no purchase of special equipment by the end user. Furthermore, with the exception of the applicator assembly, many existing label assemblies can be adapted, modified or retrofitted to produce such a product.

While in accordance with the patent statutes, the best mode and preferred embodiment of the invention have been described, it is to be understood that the invention is not limited thereto, but rather is to be measured by the scope and spirit of the appended claims.

What is claimed is:

1. A method of producing a continuous label web comprising the steps of:

(a) applying a first adhesive layer to a web first surface of a web of label stock having a first and a second surface;

(b) releasably contacting a release liner to said adhesive, said release liner having a low energy bonding surface and a high energy bonding surface, said low energy bonding surface in contact with said first adhesive;

(c) applying a second adhesive layer to said web second surface;

(d) removing said release liner from said first adhesive layer;

(e) reapplying said release liner to said second adhesive on said web second surface, such that said high energy bonding surface engages said second adhesive.

2. A method of producing a continuous web of labels as recited in claim 1 and further comprising the step of making perforated cuts at a succession of locations along the length of said web so as to define a plurality of individual labels.

3. A method as recited in claim 1, wherein said release liner is essentially transparent.

4. A method as recited in claim 1, wherein said release liner is made of a polypropylene material.

5. A method as recited in claim 1, wherein said release liner is made of a polyethylene film material.

6. A method as recited in claim 1, wherein said release liner is made from a polyester film.

7. A method as recited in claim 1, wherein said second adhesive is an essentially transparent adhesive.

8. A method as recited in claim 1, wherein said second adhesive is substantially a permanent adhesive.

9. The method of producing a continuous label web as recited in claim 1 comprising a further step inserted between steps (b) and (c):

applying printed indicia to said web second surface.

10. The method of producing a continuous label web as recited in claim 1 comprising the further step of:

(f) winding the web into rolled form.

11. A method of producing a continuous label web from a label stock, said label stock having a first and a second surface, said label stock first surface having a layer of first adhesive disposed on at least a portion thereof and further comprising a release liner having a low energy bonding surface and a high energy bonding surface, said low energy bonding surface of said release liner contacting said first adhesive layer, said method comprising the steps of:

(a) applying a layer of second adhesive to at least a portion of said label stock second surface;

(b) removing said release liner from said first adhesive layer;

(c) reapplying said release liner to said second adhesive on said base label stock second surface such that said high energy bonding surface contacts said second adhesive.

12. The method of producing a continuous label web from a label stock as recited in claim 11 comprising a further step inserted prior to step (a):

applying printed indicia to said label stock second surface.

13. The method of producing a continuous label web from a label stock as recited in claim 11 further comprising the step of:

(d) winding the web into a rolled form.

14. A method of producing a continuous label web as recited in claim 11 and further comprising the step of:

making perforated cuts at a succession of locations along the length of said web so as to define a plurality of individual labels.

15. A method as recited in claim 11, wherein said release liner is essentially transparent.

16. A method as recited in claim 11, wherein said release liner is made of a polypropylene material.

17. A method as recited in claim 11, wherein said release liner is made of a polyethylene film material.

18. A method as recited in claim 11, wherein said release liner is made from a polyester film.

19. A method as recited in claim 11, wherein said second adhesive is an essentially transparent adhesive.

20. A method as recited in claim 11, wherein said second adhesive is substantially a permanent adhesive.

21. A method of producing a continuous label comprising the steps of:

(a) applying a first adhesive layer to a low energy bonding surface of a release liner, said release liner having a low energy bonding surface and a high energy bonding surface;

(b) contacting said release liner containing said first adhesive layer with a web first surface of a web of label stock having a first and a second surface;

(c) applying a second adhesive layer to said web second surface;

(d) removing said release liner from said first adhesive layer;

(e) reapplying said release liner to said second adhesive on said web second surface, such that said high energy bonding surface engages said second adhesive.

* * * * *